(12) United States Patent
Robinson

(10) Patent No.: US 6,585,616 B1
(45) Date of Patent: Jul. 1, 2003

(54) MAGNETO-RHEOLOGICAL VARIABLE LIMITED SLIP DIFFERENTIAL

(75) Inventor: Nicholas Alan Robinson, Plain City, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/705,761

(22) Filed: Nov. 6, 2000

(51) Int. Cl.⁷ .......................... F16H 48/26; F16H 48/30
(52) U.S. Cl. .......................................... 475/85; 475/150
(58) Field of Search ........................... 475/85, 86, 150; 192/21.5, 84.1, 48.2

(56) References Cited

U.S. PATENT DOCUMENTS

| | | | |
|---|---|---|---|
| 4,896,754 A | * | 1/1990 | Carlson et al. ............ 192/21.5 |
| 5,054,593 A | * | 10/1991 | Carlson ..................... 192/21.5 |
| 5,080,640 A | | 1/1992 | Botterill ..................... 475/231 |
| 5,090,510 A | | 2/1992 | Watanabe et al. ........... 180/197 |
| 5,090,531 A | * | 2/1992 | Carlson ..................... 192/21.5 |
| 5,171,192 A | | 12/1992 | Schlosser et al. ........... 475/237 |
| 5,322,484 A | * | 6/1994 | Reuter ......................... 475/150 |
| 5,373,912 A | | 12/1994 | Haiki et al. .................. 180/249 |
| 5,690,002 A | | 11/1997 | Showalter ..................... 74/650 |
| 5,718,653 A | | 2/1998 | Showalter .................... 475/230 |
| 5,779,013 A | | 7/1998 | Bansbach .................. 192/21.5 |
| 5,845,753 A | | 12/1998 | Bansbach .................. 192/21.5 |
| 6,183,386 B1 | * | 2/2001 | Duggan ........................ 475/84 |
| 6,334,832 B1 | * | 1/2002 | Heravi et al. ................. 475/85 |

FOREIGN PATENT DOCUMENTS

JP 363025142 * 2/1988 ........... B60K/23/04

OTHER PUBLICATIONS

The Motor Vehicle; Twelfth Edition; K. Newton, W. Steeds and T.K. Garrett; 1996; pp.: 755–770.

* cited by examiner

Primary Examiner—Sherry Estremsky
Assistant Examiner—Tisha D. Lewis
(74) Attorney, Agent, or Firm—Mark E. Duell, Esq.; Morgan, Lewis & Bockius LLP

(57) ABSTRACT

A differential includes: a driving member; a first driven member; a second driven member; and a coupling between the driving member and each of the driven members, the coupling includes: an input member connected to one of the driving member, the first driven member and the second driven member; an output member connected to another one of the first driven member and the second driven member, wherein there is a first space between the output member and the input member; a magneto-rheological fluid located in the space; and at least one electromagnet proximate the space.

20 Claims, 3 Drawing Sheets

MAGNETO-RHEOLOGICAL VARIABLE LIMITED SLIP DIFFERENTIAL

BACKGROUND OF THE INVENTION

1. Field of the Invention

The present invention relates to a differential, and more particularly, to a limited slip differential.

2. Discussion of the Related Art

Conventional differentials permit one output shaft to rotate at a different speed relative to the other output shaft. A limited slip coupling may be provided in the differential to prevent this relative rotation under certain conditions. Typically, this coupling employs a mechanical coupling that locks the differential only under a single torque or speed condition.

When a conventional limited slip differential (LSD) is employed in a vehicle driveline, for example, at least two different conditions are desired in which the differential will lock. That is, a high locking factor may be desired to initiate movement of the vehicle. However, a low locking factor is desired during other maneuvers, such as sharp turns at low speed, high speed driving, or at the limits of traction. Unfortunately, due to the mechanical nature of these conventional LSDs, only one of these conditions may be met. For example, an LSD designed to have a high lock-up value will impart a drag during sharp turning maneuvers at low speed.

SUMMARY OF THE INVENTION

Accordingly, the present invention is directed to a differential that substantially obviates one or more of the problems due to limitations and disadvantages of the related art.

An object of the present invention is to provide a differential that can accommodate a variety of torque and speed conditions.

Another object of the present invention is to provide a differential capable of operating with a high lock-up and as an open differential.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the differential includes: a driving member; a first driven member; a second driven member; and a coupling between the driving member and each of the driven members, the coupling includes: an input member connected to one of the driving member, the first driven member and the second driven member; an output member connected to another one of the first driven member and the second driven member, wherein there is a first space between the output member and the input member; a magneto-rheological fluid located in the space; and at least one electromagnet proximate said space.

In another aspect, a variable limited slip differential includes: a driving member; a first driven member perpendicular to the driving member; a second driven member perpendicular to the driving member; a coupling between the driving member and each of the driven members, the coupling includes: a differential coupling; and a variable coupling parallel to the differential coupling, wherein the variable coupling comprises: an input member connected to one of the driving member, the first driven member and the second driven member; an output member connected to another one of the first driven member and the second driven member, wherein there is a space between the output member and the input member; a magneto-rheological fluid located in the first space; and at least one electromagnet proximate the space.

In a further aspect, a method for controlling a differential including a first member and a second member rotatably mounted in a housing, the method includes: sensing an initial throttle position; determining if the initial throttle position is greater than a first value; sensing a speed at each of the first member and the second member if the initial throttle position is greater than the first value; determining if the difference in magnitude between the sensed speeds is greater than a second value; energizing an electromagnet if the speed difference is greater than the second value; and subjecting a magneto-rheological fluid to the magnetic field created by energizing the electromagnet.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
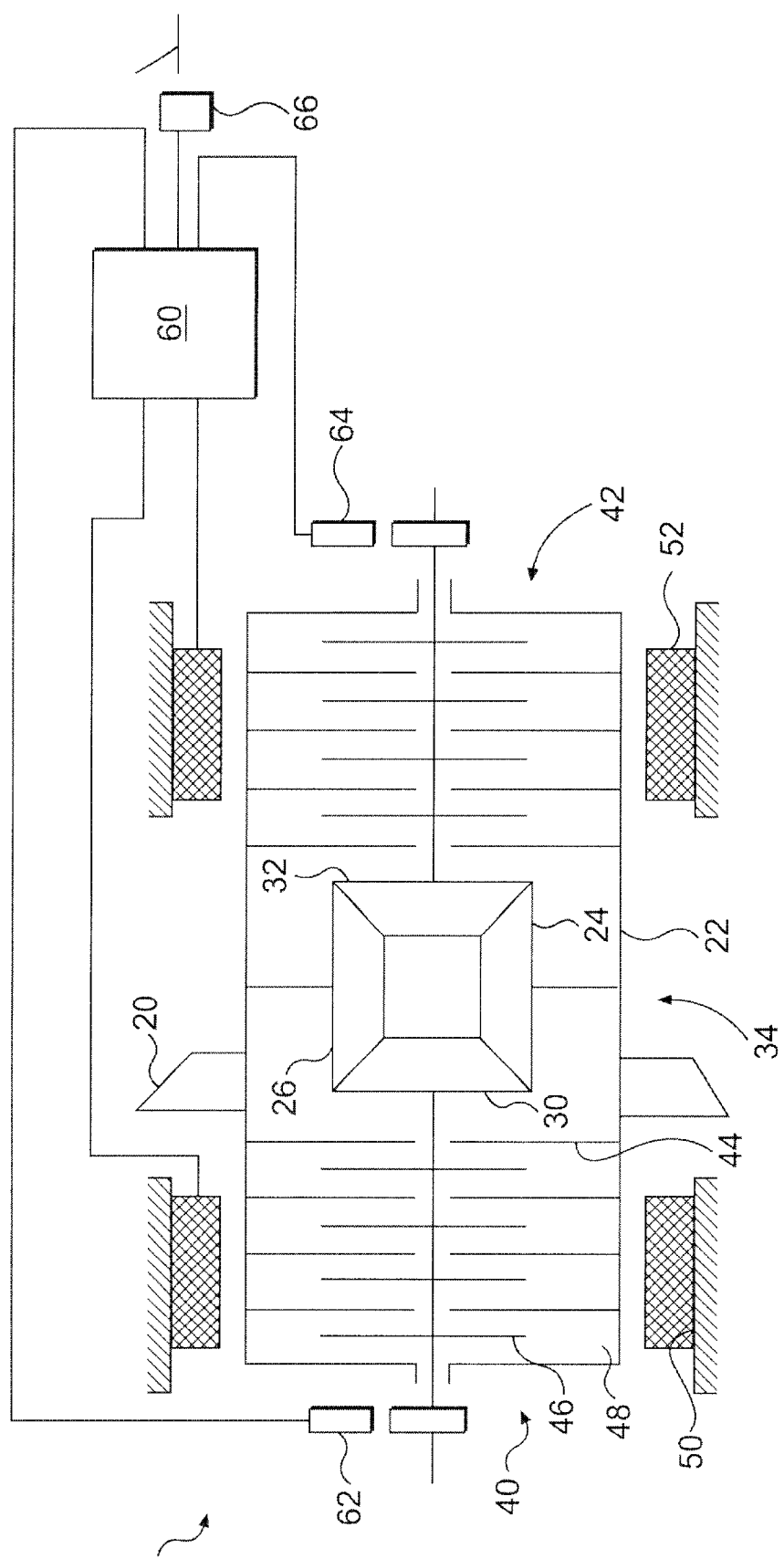
FIG. 1 schematically illustrates a first embodiment of a differential.

FIG. 1 schematically illustrates a first embodiment of a differential 10. A driving member includes a ring gear 20, a differential carrier 22 and two differential gears 24, 26 rotatably mounted in the differential carrier 22. The ring gear 20 can be replaced with any other suitable input gear configuration, such as, integrally forming gear teeth on the carrier.

Two driven members 30, 32 are rotatably mounted in the differential carrier 22. The two driven members 30, 32 engage each of the two differential gears 24, 26 to create a differential coupling 34 between the differential carrier 22 of the driving member and the driven members 30, 32. This differential coupling 34 allows one driven member 30 to rotate relative to the other driven member 32 while maintaining torque transfer from the driving member to at least one of the driven members 30, 32. The driven members 30, 32 and the differential gears 24, 26 can be bevel gears, spur gears or any other similar arrangement.

The driven members 30, 32 are also selectively connected to the differential carrier 22 by a pair of couplings 40, 42. The couplings 40, 42 are arranged in parallel with the differential coupling 34.

The couplings 40, 42 are identical and only one of the couplings 40 will be explained in detail. The coupling 40 includes at least one input plate 44 and at least one output plate 46. In this preferred embodiment, there can be more than one input plate 44 and more than one output plate 46. Each input plate 44 is connected to the differential carrier 22 in a conventional manner, such as by splines. Each output plate 46 is connected to one of the driven members 30 in a conventional manner, such as by splines. Each output plate 46 is spaced from and alternately extends between the input plates 44. A magneto-rheological fluid 48 fills the space between the input plates 44 and the output plates 46. An electromagnet 50 encircles the differential carrier 22 adjacent the input plates 44 and the output plates 46. An electromagnet 52 is associated with the other coupling 42.

An electronic control unit 60 receives input from two speed sensor 62, 64 and a throttle position sensor 66. The speed sensors 62, 64 measure the respective rotational speed of the driven members 30, 32.

The electronic control unit 60 sends control signals to each of the electromagnets 50, 52 based on the input signals received from the speed sensors 62, 64 and the throttle position sensor 66. Energization of the electromagnets 50, 52 creates a magnetic field in each of the couplings 40, 42. These magnetic fields increase the viscosity of the magneto-rheological fluid 48 in each of the couplings 40, 42. As the viscosity of the magneto-rheological fluid 48 increases, the magneto-rheological fluid 48 transmits torque from the input plates 44 to the output plates 46. This creates a coupling between the differential carrier 22 and the driven members 30, 32 that parallels the differential coupling 34 between the differential gears 24, 26 and the driven members 30, 32. If the viscosity of the magneto-rheological fluid 48 is increased sufficiently, all of the torque from the differential carrier 22 is transmitted equally to the driving members 30, 32.

Figure 2:
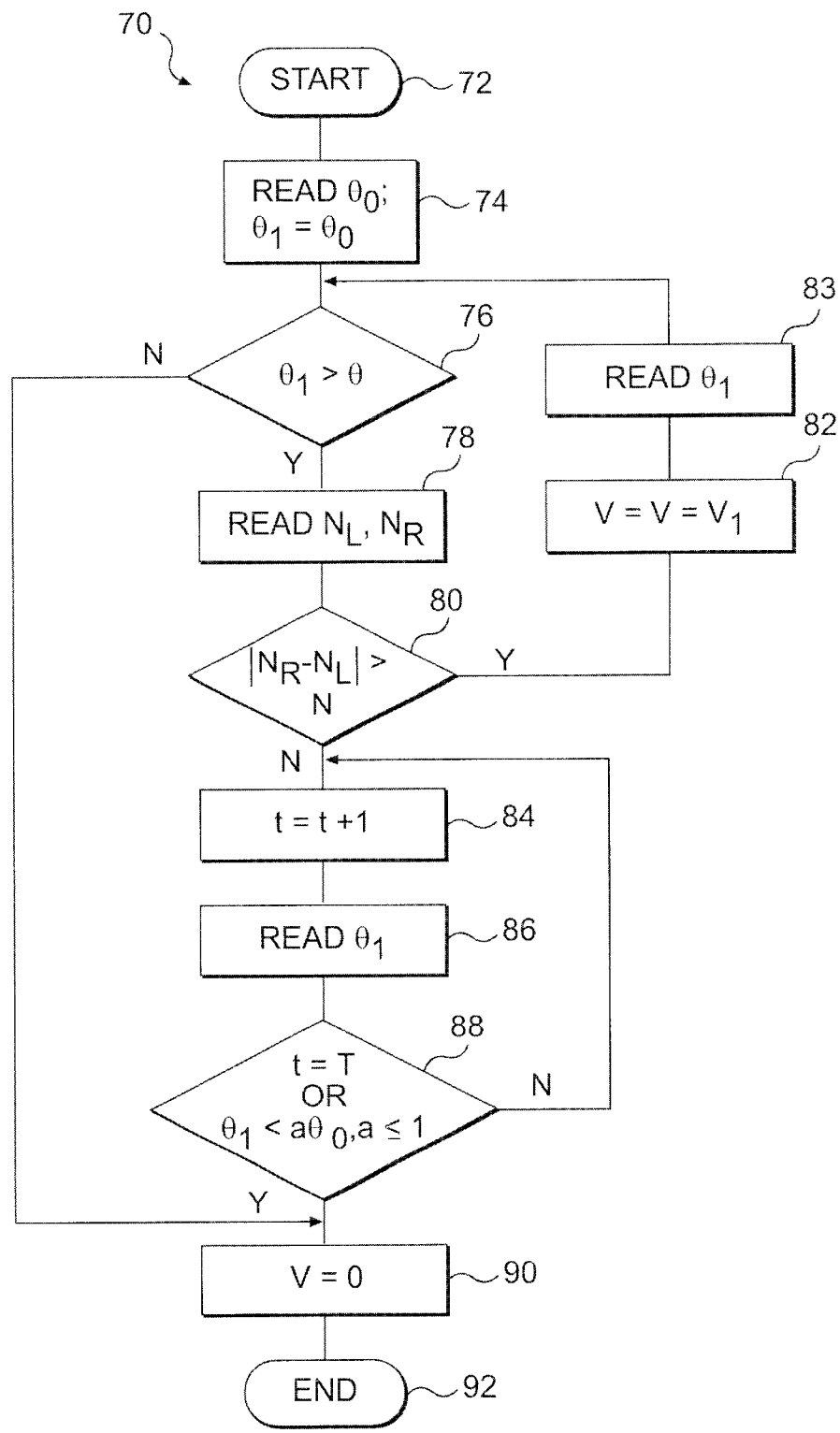
FIG. 2 is a flow chart of a method for controlling a differential as illustrated in FIG. 1.

FIG. 2 refers to a preferred embodiment of the operation of the control unit 60 used. The differential in this preferred embodiment is used in a vehicle powertrain.

The control subroutine 70 begins at step 72, which initializes the subroutine to clear all previous input data, calculations and decisions. Next, an initial throttle position signal $\theta_0$ from the throttle position sensor 66 is read and an instantaneous throttle position $\theta_1$ is set at the initial throttle position $\theta_0$ at step 74. This initial throttle position signal $\theta_0$ is compared to a predetermined reference throttle position $\theta$ at step 76. If the instantaneous throttle position signal $\theta_1$ is greater than the reference throttle position $\theta$, then the process continues to step 78. Otherwise, the subroutine jumps to step 90 and is terminated.

At step 78, the signals $N_L$, $N_R$ from the two speed sensors 62, 64 are read. Step 80 compares the difference in magnitude of these two signals $N_L$, $N_R$ with a predetermined reference speed N. If this difference in magnitude is greater than the reference speed N, then the subroutine proceeds to step 82. Otherwise, the subroutine advances to step 84.

A difference in magnitude of the two speed signals $N_L$, $N_R$ indicates loss of traction of one of the driven wheels of the vehicle. At step 82, a voltage signal V is increased to a predetermined incremental voltage $V_I$. The voltage signal V is sent to each of the electromagnets 50, 52 to energize them. The signal from the throttle position sensor 66 is read at step 74 to update the instantaneous throttle position signal $\theta_1$.

The subroutine then returns to step 76 and these steps 76–83 are repeated until the wheel slippage falls below the reference speed N (step 80) or until the throttle position signal falls below the reference position $\theta$ (step 76).

The subroutine proceeds to step 84 once the wheel slippage falls below the reference speed N. A timer t is started at step 84. At step 86, the signal from the throttle position sensor 66 is read to update the instantaneous throttle position signal $\theta_1$. A comparison of the timer t and the instantaneous throttle position signal $\theta_1$ to respective predetermined reference values is made at step 88. The subroutine returns to step 84 and repeats the steps 84–88 until the timer t reaches a predetermined timer reference value T or the instantaneous throttle position signal $\theta_1$ drops to a predetermined percentage a of the initial throttle position signal $\theta_0$ in step 88. If step 88 returns an answer of Yes, then the subroutine 70 proceeds to step 90, where the voltage signal V is reduced to zero and the differential coupling 34 transmits the torque from the differential carrier 22 to the driven members 30, 32. The subroutine 70 then passes onto step 92 where it is terminated.

Although this preferred control subroutine 70 only relies on driven member speeds and throttle position as inputs, other vehicle inputs, such as engine speed, transmission output shaft speed, gear selection, drive mode (e.g., sport, winter, off-road), steering angle, yaw rate, lateral acceleration, longitudinal acceleration and vehicle inclination, can be utilized.

Figure 3:
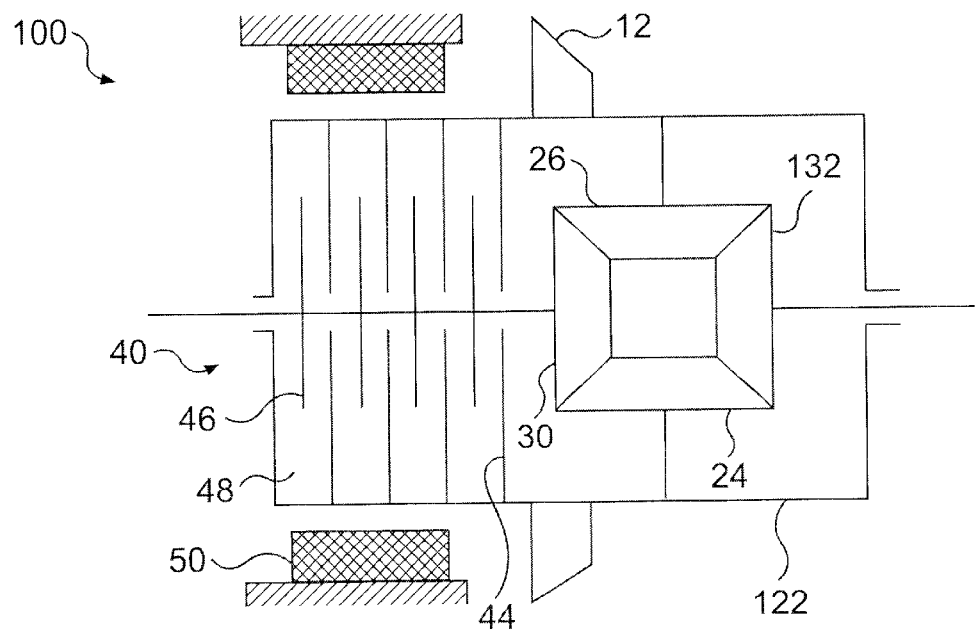
FIG. 3 schematically illustrates a second embodiment of a differential.

FIG. 3 shows a second embodiment of a differential 100 that is similar to that of FIG. 1, except only one coupling 40 is used. Like numerals in FIG. 3 correspond to like elements of FIG. 1. The controller 60 and the sensors 62, 64, 66 have been omitted for clarity.

One driven member 30 is coupled to the differential carrier 122 via the differential gears 24, 26 and the coupling 40, whereas the other driven member 132 is coupled to the differential carrier 122 only by the differential gears 24, 26.

Figure 4:
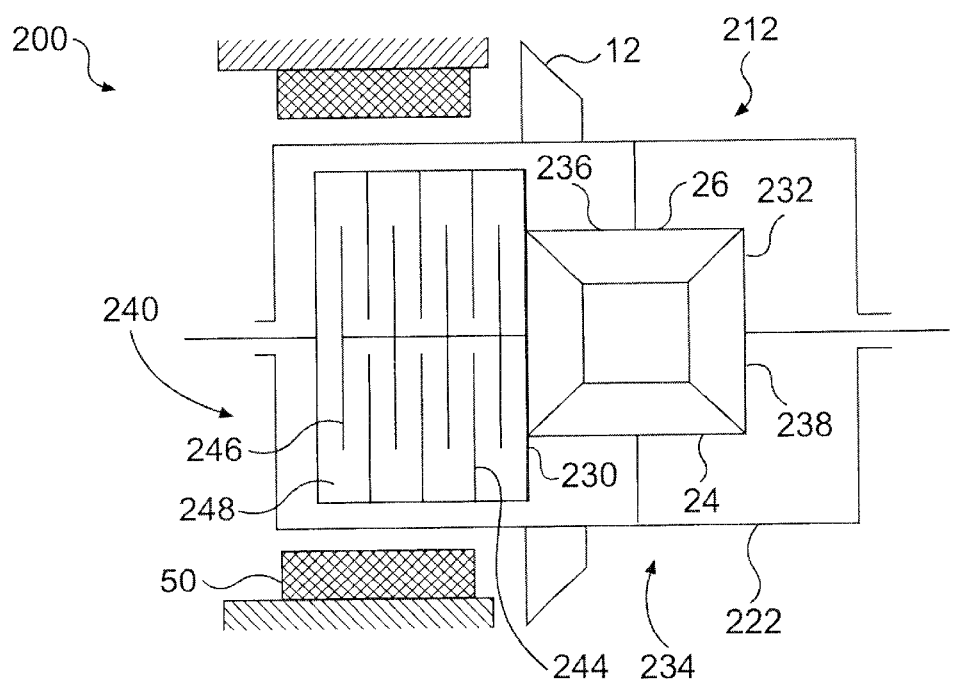
FIG. 4 schematically illustrates a third embodiment of a differential.

A third embodiment of a differential 200 is represented in FIG. 4. This differential 200 is similar to that of FIG. 3 in that only one coupling 240 is utilized. Like numerals in FIG. 4 correspond to like elements of FIG. 1. The controller 60 and the sensors 62, 64, 66 have been omitted for clarity.

The driven members 230, 232 are rotatably mounted in the differential carrier 222 and engage the differential gears 24, 26 to form a differential coupling 234 between the differential carrier 222 and the driven members 230, 232.

One driven member 230 is annular to define an opening 236. A shaft 238 is connected to the other driven member 232 and extends through the opening 236 in the annular driven member 230.

A coupling 240 is arranged in parallel to the differential coupling 234. This coupling 240 includes at least one input plate 244 and at least one output plate 246. There can be more than one input plate 244 and more than one output plate 246, as is shown in FIG. 4. Each input plate 244 is connected to one driven member 230 in a conventional manner, such as by splines. Each output plate 246 is connected the other driven member 232 in a conventional manner, such as by splines. Each output plate 246 is spaced from and alternately extends between each input plate 244. A magneto-rheological fluid 248 fills the space between the input plates 244 and the output plates 246. An electromagnet 50 encircles the input plates 244 and the output plates 246.

The control subroutine 70 can be used in the alternate embodiments of the differential illustrated in FIGS. 3 and 4. Likewise, any of the above described modifications to the subroutine 70 can also be made to the subroutine 70 when it is used with the differential of FIG. 3 or FIG. 4.

Although each of the disclosed embodiments of the differential includes a gear-type differential coupling, such a coupling is not required. This is due to the variability of the viscosity of the magneto-rheological fluid. For example, the preferred embodiment of FIG. 1 can be modified to omit the differential gears 24, 26 from the differential carrier and the driven members 30, 32. Individual modulation of each of the electromagnets 50, 52 in each of the couplings 40, 42 can be performed by the electronic control unit 60 to provide the differential driving of the driven members 30, 32. Various inputs, as discussed above, providing vehicle dynamic data can be fed into the electronic control unit 60. The electronic control unit 60 can then determine an appropriate energization level respective to each coupling 40, 42. A control process such as that disclosed in U.S. Pat. No. 5,690,002, which is hereby incorporated by reference, can be used to determine the appropriate energization level for each coupling 40, 42.

It will be apparent to those skilled in the art that various modifications and variations can be made in the differential of the present invention without departing from the spirit or scope of the invention. Thus, it is intended that the present invention covers the modifications and variations of this invention provided they come within the scope of the appended claims and their equivalent.

What is claimed is:

1. A differential comprising:
  a driving member;
  a first driven member;
  a second driven member; and
  a coupling between the driving member and each of the driven members, the coupling comprising:
    a differential coupling to distribute torque from the driving member to the first driven member and the second driven member; and
    a variable coupling including:
      an input member connected to one of the driving member, the first driven member and the second driven member;
      an output member connected to another one of the first driven member and the second driven member, wherein there is a first space between the output member and the input member;
      a magneto-rheological fluid located in the first space; and
      at least one electromagnet proximate to the first space which activates the magneto-rheological fluid to limit the distribution of torque from the driving member to the first and second driven members.

2. The differential of claim 1 further comprising:
  a speed sensor on each of the driven members; and
  a controller connected between the speed sensors and the at least one electromagnet.

3. The differential of claim 2 further comprising a throttle position sensor connected to the controller.

4. A differential comprising:
  a driving member;
  a first driven member;
  a second driven member; and
  a coupling between the driving member and each of the driven members, the coupling including:
    an input member connected to one of the driving member, the first driven member and the second driven member;
    an output member connected to another one of the first driven member and the second driven member, wherein there is a first space between the output member and the input member;
    a magneto-rheological fluid located in the first space; and at least one electromagnet proximate to the first space;
    wherein the driving member includes a differential carrier;
    wherein the first and second driven members include first and second differential gears, respectively, mounted to the differential carrier; and
    wherein the coupling further includes:
      third and fourth differential gears mounted to the differential carrier, wherein the input member is connected to one of the driving member, the differential carrier and the first differential gear, and the output member is connected to another one of the first differential gear and the second differential gear.

5. The differential of claim 4 wherein each of the third and fourth differential gears is engaged with both of the first and second differential gears.

6. The differential of claim 5 wherein the driving member further comprises an input gear connected to the differential carrier.

7. A differential comprising:
  a driving member;
  a first driven member;
  a second driven member; and
  a coupling between the driving member and each of the driven members, the coupling including:
    an input member connected to one of the driving member, the first driven member and the second driven member;
    an output member connected to another one of the first driven member and the second driven member, wherein there is a first space between the output member and the input member;
    a magneto-rheological fluid located in the first space;
    at least one electromagnet proximate to the first space; and
    a second output member separated from the input member by a second space, wherein the magneto-rheological fluid is located in the first space and the second space;
    a second electromagnet proximate to the second space;
    wherein the input member is connected to the driving member, the output member is connected to the first driven member, and the second output member is connected to the second driven member.

8. The differential of claim 7 wherein:
  the input member comprises a first set of spaced plates; and
  the output member comprises a second set of spaced plates extending between the spaced plates of the first set, wherein the magneto-rheological fluid extends between the first set of plates and the second set of plates.

9. The differential of claim 1 wherein the first and second driven members are coaxial.

10. A variable limited slip differential comprising:
  a driving member;
  a first driven member perpendicular to the driving member;
  a second driven member perpendicular to the driving member;

a coupling between the driving member and each of the driven members, the coupling comprising:
   a differential coupling to distribute torque from the driving member to the first driven member and the second driven member; and
   a variable coupling parallel to the differential coupling, wherein the variable coupling comprises:
      an input member connected to one of the driving member, the first driven member and the second driven member;
      an output member connected to another one of the first driven member and the second driven member, wherein there is a first space between the output member and the input member;
      a magneto-rheological fluid located in the first space; and
      at least one electromagnet proximate to the first space which activates the magneto-rheological fluid to limit the distribution of torque from the driving member to the first and second driven members.

11. The variable limited slip differential of claim 10 wherein the differential coupling comprises:
   a first differential member; and
   a second differential member, wherein each of the first differential member and the second differential member engages both of the first and second driven members.

12. The variable limited slip differential of claim 11 wherein the differential coupling further comprises a differential carrier connected to the driving member, wherein the first differential member, the second differential member, the first driven member and the second driven member are rotatably mounted to the differential carrier.

13. The variable limited slip differential of claim 12 wherein the first driven member is coaxial with the second driven member.

14. The variable limited slip differential of claim 10 further comprising:
   a speed sensor on each of the driven members; and
   a controller connected between the speed sensors and the at least one electromagnet.

15. A differential comprising:
   a driving member including a differential carrier;
   a first driven member including a first differential gear mounted in the differential carrier;
   a second driven member including a second differential gear mounted in the differential carrier, the differential carrier, the first differential gear and the second differential gear cooperating to distribute torque from the driving member to the first driven member and the second driven member; and
   a coupling between the driving member and each of the driven members, the coupling including:
      an input member connected to one of the driving member, the first driven member and the second driven member;
      an output member connected to another one of the first driven member and the second driven member;
      a magneto-rheological fluid located between the output member and the input member; and
      at least one electromagnet proximate to the magneto-rheological fluid which activates the magneto-rheological fluid to limit the distribution of torque from the driving member to the first and second driven members.

16. The differential according to claim 15, wherein the input member is connected to one of the driving member, the differential carrier and the first differential gear, and the output member is connected to another one of the first differential gear and the second differential gear.

17. The differential of claim 15 further comprising:
   a speed sensor on each of the driven members; and
   a controller connected to the speed sensors and the at least one electromagnet.

18. The differential according to claim 16, wherein the coupling further comprises third and fourth differential gears engaging each of the first and second differential gears.

19. The differential of claim 18, wherein the third and fourth differential gears are connected to the differential carrier.

20. The differential of claim 17, further comprising a throttle position sensor connected to the controller.

* * * * *